United States Patent
Takahashi et al.

(10) Patent No.: US 7,370,330 B2
(45) Date of Patent: *May 6, 2008

(54) INFORMATION PROCESSING APPARATUS HAVING SIMPLIFIED USER SWITCHING FUNCTION AND PROGRAM FOR USE THEREWITH

(75) Inventors: Kazuaki Takahashi, Tokyo (JP);
Hiroyuki Maruyama, Kanagawa (JP);
Yasuyoshi Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 597 days.

This patent is subject to a terminal disclaimer.

(21) Appl. No.: 10/244,965

(22) Filed: Sep. 17, 2002

(65) Prior Publication Data

US 2003/0074496 A1    Apr. 17, 2003

(30) Foreign Application Priority Data

Sep. 18, 2001   (JP) .............................. 2001-283147

(51) Int. Cl.
*G06F 9/48*    (2006.01)
*G06F 3/048*   (2006.01)

(52) U.S. Cl. ................ 718/107; 715/778; 715/750

(58) Field of Classification Search ............. 718/100, 718/102, 103; 719/310–320; 713/300–321; 714/24

See application file for complete search history.

(56) References Cited

U.S. PATENT DOCUMENTS 5,682,550 A * 10/1997 Brown et al. ............... 710/10
6,184,883 B1 * 2/2001 Bates et al. ................. 715/794
6,795,967 B1 * 9/2004 Evans et al. ................ 719/310
6,826,755 B1 * 11/2004 Kabir et al. ................ 718/108
2002/0038333 A1 * 3/2002 Evans et al. ................ 709/107

FOREIGN PATENT DOCUMENTS

| JP | A 07-28544 | 1/1995 |
| JP | A 07-28616 | 1/1995 |
| JP | A 10-283323 | 10/1998 |
| JP | A 11-25040 | 1/1999 |
| JP | A 2003-517672 | 5/2003 |

* cited by examiner

*Primary Examiner*—Lewis A. Bullock, Jr.
(74) *Attorney, Agent, or Firm*—Robert J. Depke; Rockey, Depke & Lyons, LLC.

(57) ABSTRACT

An information processing apparatus having a simplified switching function of a user is disclosed that can reduce the processing burden upon a CPU and eliminate an action that is not intended by its user. If an application, which implements a function of a device or the like that is not supported as a standard device by an OS and is started up for each user, has been started up by a first user who is not active at present, that is, a user in a logon state whose desktop has been switched to that of a second user, then part of the processing of the application is temporarily stopped. Then, if it is detected that the first user is rendered operative, that is, when the desktop is switched to that of the first user, the processing of the application of the first user is re-started. Since the processing of the application by the user (first user) who is not active at present is temporarily stopped partially, the other user (second user) who is active at present can execute its processing without being influenced by the processing of the former user.

20 Claims, 12 Drawing Sheets

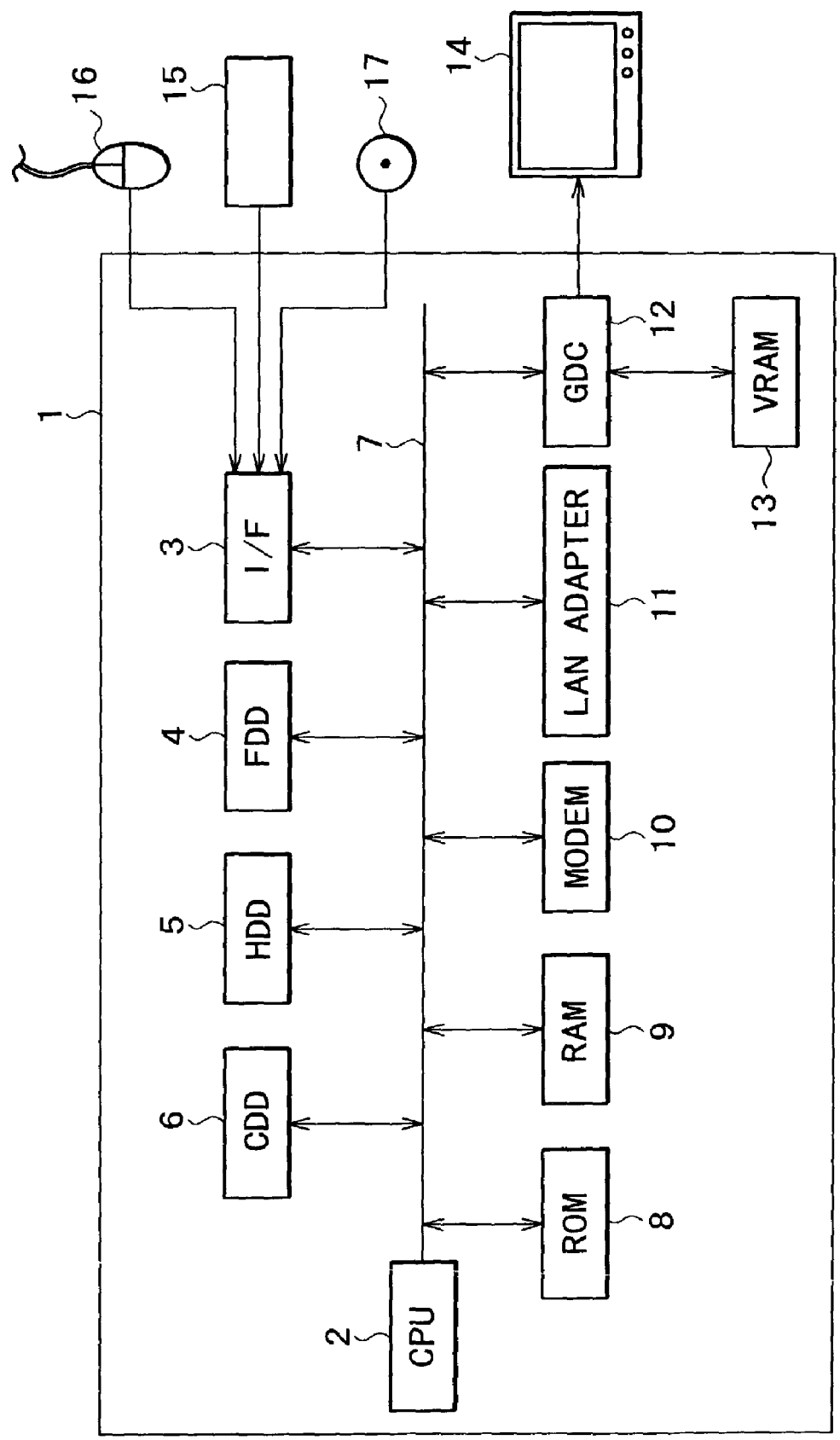

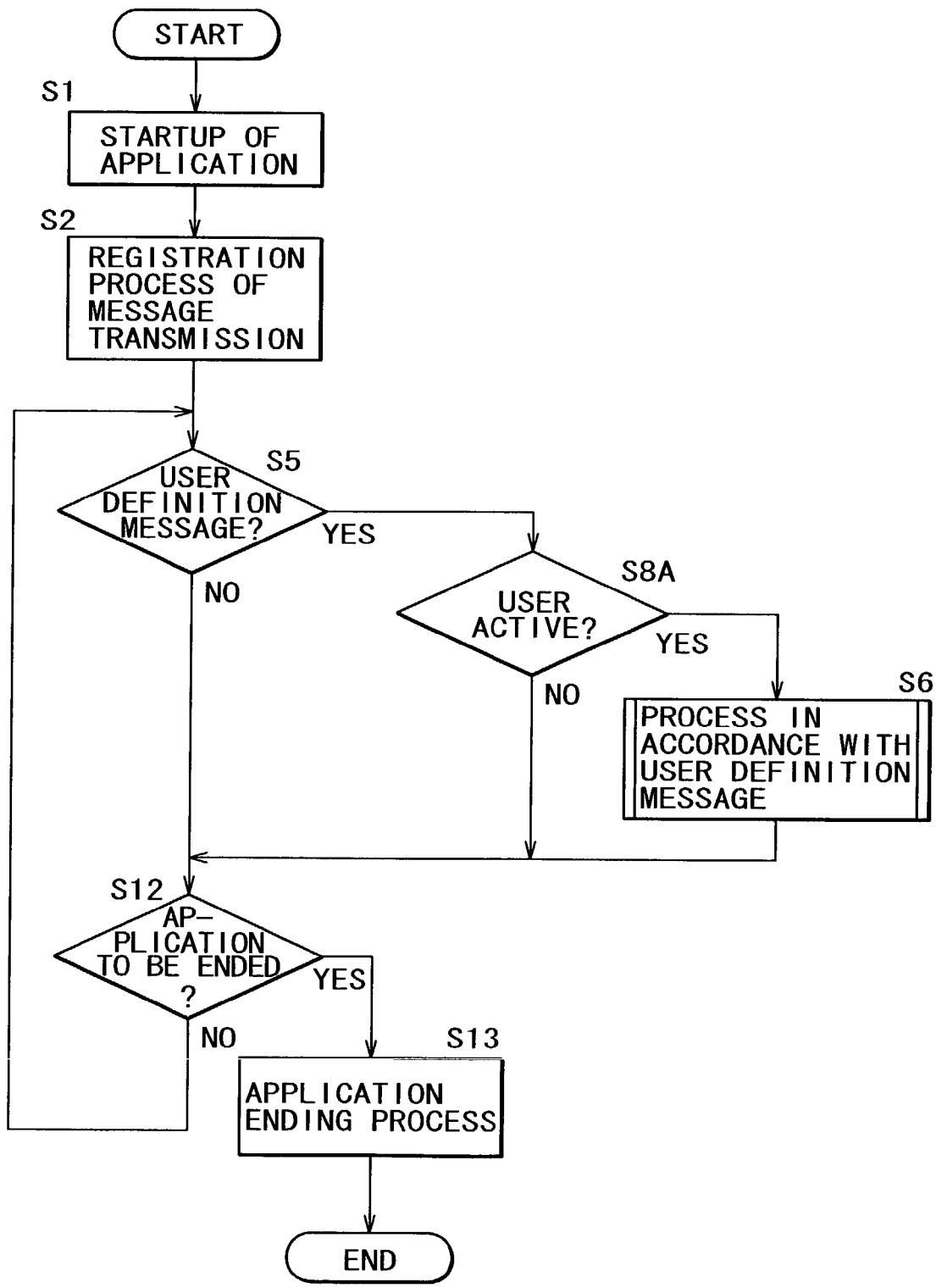
F I G. 1 2

INFORMATION PROCESSING APPARATUS HAVING SIMPLIFIED USER SWITCHING FUNCTION AND PROGRAM FOR USE THEREWITH

This application claims priority to Japanese Patent Application Number JP2001-283147 filed Sep. 18, 2001 which is incorporated herein by reference.

BACKGROUND OF THE INVENTION

This invention relates to a technique for reducing the processing burden on a calculation section and preventing occurrence of an action not intended by a user in an apparatus in which an operating system having a simplified switching function of a user is incorporated.

As one of operating systems ready for multiple users and multiple tasks for use with a computer system, an operating system having a simplified switching function of a user (for example, Windows XP: trademark of Microsoft) is known. The operating system of the type mentioned provides a function (function on a local computer) convenient where a single computer is used by a plurality of users. In particular, since the operating system allows switching from a first user to a second user to be performed through authentication of the person itself by inputting of a password or the like while the first user remains in a logon state without the necessity for a logoff operation by the first use. It is advantageous in that, for example, when members of a family use a single computer commonly, each member can use the same application by changing over the desktop.

However, all of devices and hardware elements, which compose a computer, are not always supported or managed in a standardized fashion by an operating system (hereinafter referred to simply as OS) incorporated in the computer. For example, the following devices or hardware elements are not supported or managed in a standardized fashion:

(a) Operation apparatus provided in addition to standard operation inputting apparatus;

(b) Special operation keys unique to the apparatus; and (c) Devices provided additionally or connected as options, or devices that can be connected in a form selected by a user from among a plurality of forms, and so forth.

For example, while a keyboard and a mouse are standardized operation inputting apparatus and supported as standard apparatus by an OS, some other operation apparatus can be added for the object of enhancement of the operability, assistance to an operation and so forth. If a dial type operation apparatus is taken as an example, it allows a higher speed operation, because a desired choice can be selected from among a plurality of choices by a rotating operation of the dial and the selected choice can be settled by a pressing operation of the dial.

Meanwhile, as special operation keys, for example, a hotkey (simultaneous operation of a "Fn" key and a function key) or a shortcut key that realizes a corresponding function by depressing a desired function key or the like while a particular key on a keyboard is kept depressed, an image pickup operation key on an apparatus in which a camera is incorporated, an operation key (PPK: Programmable Power Key) for making the power supply available and performing automatic start up of an application, and so forth may be listed.

As an additional device, for example, an input/output device (for example, a card reader/writer), which is required when an application is used, may be listed.

Also, although there are devices that are supported or managed to some degree in a standardized fashion by an OS, these do not provide a sufficient service in regard to the convenience to the user because they are not sufficiently ready for a simplified switching function of a user. For example, such devices as a battery and an AC adapter may be listed as such.

Since such devices or hardware elements as mentioned above naturally function almost hardly if they remain incorporated in an apparatus, corresponding software is required, and a user uses them through the software. Further, for example, for the dial type operation apparatus described above, a utility therefor is available. Also a hotkey processing program, a camera application for acquiring a still picture or a moving picture in response to depression of the image pickup operation key, a utility for making the power supply available and performing automatic startup of a pertaining application when a particular key is depressed are available. Further, a device driver, a management utility, or the like is installed when necessary.

For power supply circuits and apparatus such as a battery and an AC adapter, a power supply managing utility for performing supervision, setting and so forth regarding information relating to a power supply or supplies is used. The power supply managing utility has various functions such as acquisition of information of the remaining capacity of a battery, alarming (notification by voice or a display on a screen) of the shortage of the remaining capacity, and supervision against removal of a plug of an AC adapter connected to a commercial AC power supply or removal of a battery from the apparatus or against disconnection and notification to a user.

Such various applications and utilities are hereinafter referred to as "object applications".

In conventional apparatus, the following problem occurs when an object application is started up and used on an OS that has the simplified switching function of a user described above.

It is assumed now that an OS having the simplified switching function of a user is installed and two or more users are registered in one computer. Thus, the registered users can use the same application through switching therebetween.

For example, in order to switch from a user A to another user B to use an object application, the procedure is as follow:

Step 1. Startup of the computer
Step 2. Logon of the user A
Step 3. Startup of the object application by the user A
Step 4. Switching operation to the user B
Step 5. Switching to a passing screen ("Welcome screen", hereinafter described)
Step 6. Logon of the user B
Step 7. Startup of the object application by the user B.

For example, if it is assumed that the object application is software for implementing a function of a dial type operation apparatus described hereinabove, then the object application is started up by the user A at the "step 3" described above, and the object application is started up by the user B at the "step 7" described above. Therefore, at the latter point of time, the two applications (processes) are operating simultaneously on the computer.

Accordingly, for example, if the user B rotates the dial, then the object applications of both of the users B and A react with the rotation of the dial, which gives rise to some trouble in action such as troubles caused by an influence of an action or setting of a certain user upon all users.

From the problem just described, the load on the CPU is increased by an application operating on the background, or an unintended action or the like occurs. Therefore, the simplified user switching function is not made the most of or cannot be utilized conveniently.

SUMMARY OF THE INVENTION

It is an object of the present invention to provide an information processing apparatus having a simplified switching function of a user that can reduce the processing burden and eliminate an action that is not intended by its user.

In order to attain the object described above, according to an aspect of the present invention, there is provided an information processing apparatus, including: simplified user switching means having a simplified user switching function provided by an operating system for switching a user from a first user to a second user without terminating an application started up by the first user; application means for implementing a function of a device or hardware corresponding to switching of a user by the simplified user switching means; means for temporarily stopping part of processing of the application means implementing the function of a device or hardware started up by the first user who was active in the past but is not active at present; and means for re-starting the processing of the application means implementing the function of a device or hardware started up by the first user when it is detected later that the first user is rendered active.

According to another aspect of the present invention, there is provided a program used for an information processing apparatus, the apparatus including: simplified user switching means having a simplified user switching function provided by an operating system for switching a user from a first user to a second user without terminating an application started up by the first user; application means for implementing a function of a device or hardware corresponding to switching of a user by the simplified user switching means; means for temporarily stopping part of processing of the application means implementing the function of a device or hardware started up by the first user who was active in the past but is not active at present; and means for re-starting the processing of the application means implementing the function of a device or hardware started up by the first user when it is detected later that the first user is rendered active.

With the information processing apparatus, and the program used for the apparatus, since processing of an object application by a user (the first user) who is not active at present is temporarily stopped, another user (second user) who is active at present can execute processing without being influenced by the object application of the former user. Further, such a disadvantage that an action or a process, which is not intended by the user who is not active at present, is performed while the user does not know is eliminated. Furthermore, since processing of the object application such as a plotting process by the user who is not active at present is temporarily stopped, the processing burden on a CPU of the information processing apparatus can be reduced. In this manner, the simplified user switching function can be used further readily and conveniently.

BRIEF DESCRIPTION OF THE DRAWINGS

These and other objects of the invention will be seen by reference to the description, taken in connection with the accompanying drawing, in which:

FIG. 1 is a block diagram showing an example of a hardware configuration of an information processing apparatus;

FIG. 12 is a flow chart illustrating an example of a still further form of a process of the information processing apparatus of FIG. 1 where a user definition message is used.

DETAILED DESCRIPTION OF THE PREFERRED EMBODIMENTS

Figure 2:
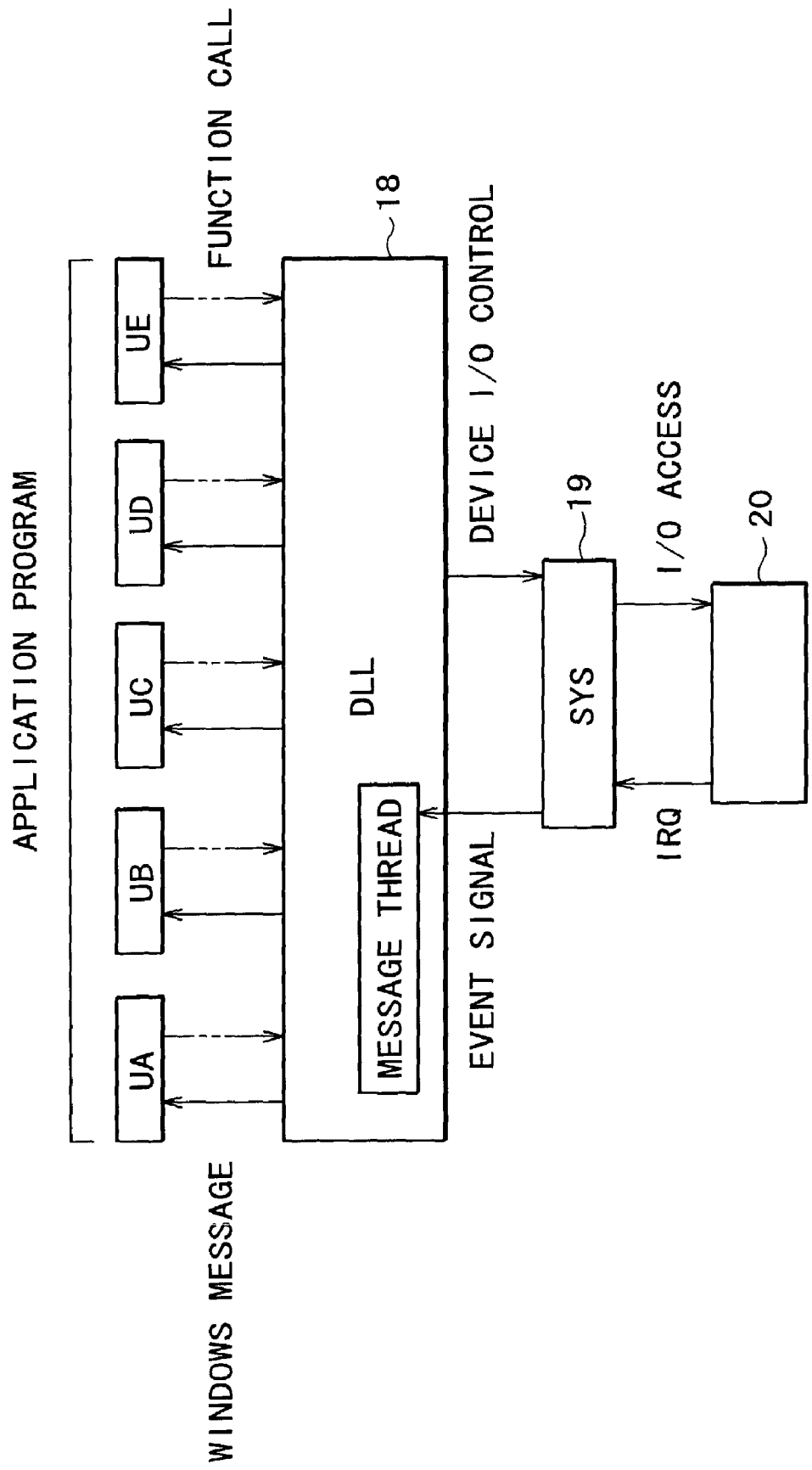
FIG. 2 is a block diagram showing a hierarchical structure of the information processing apparatus of FIG. 1 wherein the lowest hierarchy is hardware.

The present invention relates to an information processing apparatus having a simplified switching function of a user and can be applied to a computer, an image or speech processing apparatus, a measuring instrument and so forth that has the simplified switching function of a user and in which an OS ready for multiple users and multiple tasks is installed.

In the following description, the significance of terms used in the present specification is clarified first, and then, a hardware configuration and software processing are described.

Definitions of such terms as mentioned above are described first.

(a) "Simplified switching function of a user" (or simplified user switching function);

(b) A "user is active (or not active)", "active (or inactive) user"; and (c) "Welcome Screen".

The "simplified switching function of a user" or "simplified user switching function" of the paragraph (a) above is a function that is provided by an OS ready for multiple users. The entire desktop (working area on a computer screen) can be switched to that of another user without ending an application (process) started up by a user at present by selecting or executing an item "user switching". In other words, different from ordinary switching of a user by logon (or login) or logoff (or logout), switching of a user can be performed simply.

Since the time for loading an application into a memory upon switching of a user is not required anymore, there is an advantage that the time required for switching is shorter than that required for switching by logoff and logon. Therefore, the process is completed in a comparatively short period of time.

It is to be noted that this function itself is commonly known and called, for example, in the "Windows XP" mentioned hereinabove, "Fast User Switching". Further, the following description is given specifically in connection with the specific OS. However, the scope of the application of the present invention is not limited to the specific OS, but it can be applied to any OS (an OS of the Unix type or the like) only if it has a similar function. Further, user switching in the following description signifies switching of a user in the "simplified switching function of a user".

The "user is active" of the paragraph (b) above signifies a condition that the user is in a logon state and the desktop of the user is displayed on the screen. Further, the "active user" is the user in the case wherein the "user is active". The "active user" can issue a command or an instruction to the started up application at any time.

On the other hand, the "user is not an active" (or the "user is inactive") signifies another condition that the user is in a logon state but the desktop of the user is not displayed on the screen. Further, the "inactive user" signifies the user in the case wherein the "user is inactive". The "inactive user" cannot issue a command or an instruction to an application until after it performs user switching to the user itself.

It is to be noted that any user who is not in a logon state is called neither active nor inactive. Further, the definitions given above are basic definitions at all and may not possibly apply strictly depending upon a particular OS (for the "Windows XP", this is hereinafter described with reference to FIG. 4). However, this arises from its specifications or circumstances and is not essential.

The "Welcome Screen" of the paragraph (c) is a screen that appears, where the simplified switching function of a user is valid, when switching from a certain user to another user is performed. On the welcome screen, for example, selection of a user (registered user), inputting of a password or the like, shutdown, standby, re-starting and so forth can be performed. When simplified switching of a user is to be performed, the "Welcome Screen" is passed (in this significance, the "Welcome Screen" is a passed screen in user switching).

It is to be noted that the case wherein the simplified switching function of a user is valid may be, for example, a case wherein, where the simplified switching function of a user can be set by a system management utility such as a control panel, the setting is valid (that is, a case wherein the setting right is assigned to the user), another case wherein the simplified switching function of a user is valid from the beginning, a further case wherein only a particular user such as a system manager has the setting right for setting between valid/invalid.

Now, execution environments of an application are described.

FIG. 1 shows an example of a hardware configuration of an information processing apparatus.

Referring to FIG. 1, the information processing apparatus 1 as a computer and includes a central processing unit (CPU) 2 serving as a control center, an interface section (I/F) 3, a drive unit (FD) 4 for a removable magnetic disk such as a flexible disk, a drive unit (HDD) 5 for an irremovable fixed disk normally called hard disk and a drive unit (CDD) 6 for a removable optically readable disk such as an optical disk or a magneto-optical disk. The interface section 3 and drive unit 4, 5 and 6 are connected by an internal bus 7 to and controlled by the CPU 2. The information processing apparatus 1 further includes a read-only memory (ROM) 8, a random access memory (RAM) 9, a modem (MODEM) 10 for connection to a public telephone network, a LAN (Local Area Network) adapter 11 and a display device controller (GDC) 12 all connected to the CPU 2 by the internal bus 7. It is to be noted that a video RAM (VRAM) 13 necessary for image processing is provided for the display device controller 12 and signals a video signal to a display unit 14, which may be a liquid crystal display unit, or a cathode ray tube (CRT).

The information processing apparatus 1 further includes a keyboard 15, a mouse 16 and such a dial type operation apparatus 17 as described hereinabove as operation means. Operation information from the keyboard 15, mouse 16 and dial type operation apparatus 17 is received through the interface section 3 for subsequent processing.

It is to be noted that, although the information processing apparatus 1 may incorporate some pointing device such as a tablet inputting device or some other additional or optional device if necessary, illustration and description of such devices are omitted.

FIG. 2 illustrates a hierarchical structure of the information processing apparatus 1 that includes the hardware as the lowest hierarchy and further includes a device driver, a dynamic link library and various object applications arranged in order in the hardware hierarchy. Such functions by object applications as described above are implemented by the hierarchical structure. FIG. 2 shows not the entire configuration of the information processing apparatus 1 but only those elements relating to the present invention.

Referring to FIG. 2, reference characters "UA" to "UE" individually denote object applications and may correspond to utility programs for the dial type operation apparatus, for hotkey processing, for image pickup processing, for power supply connection and for automatic startup of an application and a utility program for power supply management respectively, as described hereinabove.

The dynamic link library (DLL) 18 is a subroutine group for executing various service processes for the object applications and is called by and linked to an object application upon execution thereof. The dynamic link library 18 receives a function call from an object application as indicated by an allow mark of an alternate long and two short dashes line in FIG. 2, and sends a message (refer to a "user definition message" hereinafter described) to an object application as indicted by an arrow mark of a solid line in FIG. 2 when necessary. It is to be noted that the dynamic link library 18 has a role of covering a lower hierarchy structure against the object applications, and accordingly, direct accessing from an object application to the device driver 19 or a BIOS (Basic Input/Output System) is inhibited basically.

The device driver 19 is provided as a lower hierarchy below the dynamic link library 18 and accesses the controller (micro-controller or system controller) 20, which is a component of the hardware configuration.

Figure 3:
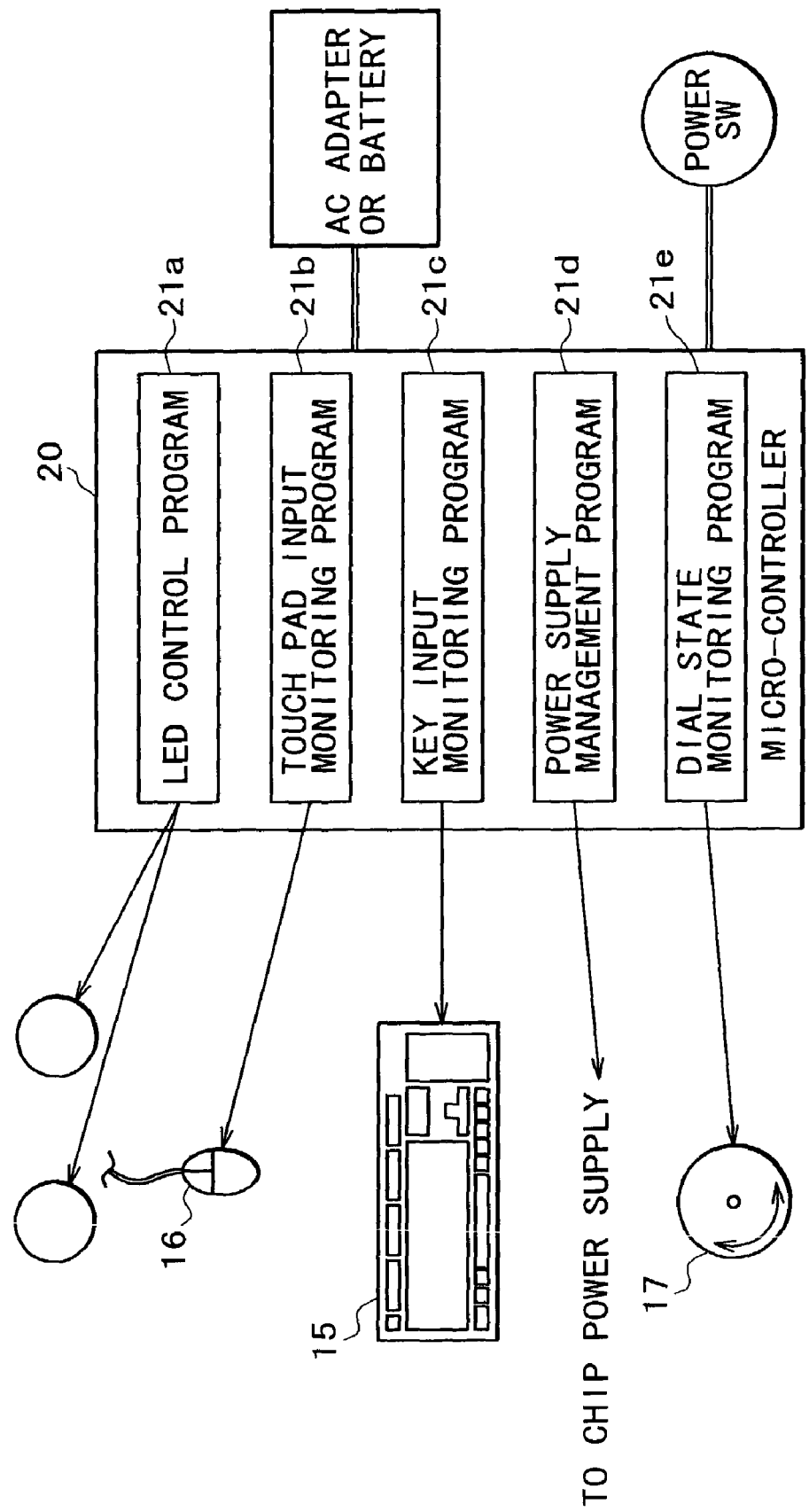
FIG. 3 is a block diagram showing a controller of the information processing apparatus of FIG. 1 and various devices controlled by the controller.

FIG. 3 illustrates the controller 20 and various devices such as indication elements, the mouse, the keyboard and a power supply switch, all controlled by the controller 20. In FIG. 3, not the hardware configuration but various processing programs are shown in the block of the controller 20. Further, in a relationship to the configuration shown in FIG. 1, the controller 20 is a component of the interface section 3.

An LED control program 21a controls indication elements, which may be light emitting diodes. The mouse 16 is placed under the process of a touch pad input monitoring program 21b. Operation input information from the keyboard 15 is processed by a key input monitoring program 21c. A power supply management program 21d receives power supply from an AC adapter or a battery and supervises and manages the power supply (chip power supply) to circuit components not shown.

A dial state monitoring program 21e detects, where such a dial type operation apparatus as described above is incorporated, a direction, an amount of rotation of the dial and a state of a switch, which is opened or closed in accordance with the dial's depression.

Referring back to FIG. 2, in response to an I/O access from the device driver 19 to the controller 20, a response (IRQ) from the controller 20 is sent to the device driver 19 when necessary.

Between the dynamic link library 18 and the device driver 19, a control access (Device I/O Control) is performed from the dynamic link library 18 to the device driver 19 whereas the device driver 19 notifies the dynamic link library 18 about information (an Event Signal) representative of an event.

The dynamic link library 18 must register a unique ID (identification information) into the device driver 19 in order to allow a message to be received from the device driver 19. To this end, the dynamic link library 18 performs such processes as to register a Window handle (descriptor or identifier provided different value for each window) of an application as the ID into the device driver 19 to acquire a message from the device driver 19 and transfer the message from a thread (Message Thread) to the pertaining application. In other words, the transfer destination of a message cannot be determined without registration of an ID. Further, overlapping registrations of an ID are inhibited, because this provides a plurality of transfer destinations.

Conventional Window handle used as an ID is unique (only one) to one user on one desktop, but may sometimes cause overlapping when a plurality of users are in a logon state simultaneously as in a case wherein simplified switching of a user is performed. In other words, since some trouble occurs if the number of users in a logon state increases in this state, some countermeasure is required.

Therefore, of 32 bits (data), which form the Window handle, those 24 bits on the least significant bit side are allocated to a substantial Window handle, and using a function that returns a user ID (session ID) for identification of a user in a logon state, the return value is allocated within the range of 8 bits on the most significant bit side to extend the Window handle.

Since this new handle (32 bits) has the structure of "user ID (session ID) of 8 bits" plus "24 bits of Window handle from the least significant bit", if the user in an logon state is different, then even if the 24 bits on the least significant bit side are same, the handle is different (the handle is unique even if a plurality of users are involved). Thus, the handle should be registered as the ID into the device driver 19 (since a notification of a registered ID is provided from the device driver 19 to the dynamic link library 18, this information can be used to specify a user and a window for execution of a process).

Identification information (an ID) registered in the device driver for acquisition of a message by the dynamic link library may have any form because, if the values of the identification information for different users and different windows can be defined so that they do not have the same value, a unique delivery destination is specified and processing of a message is performed. However, by including a bit part for distinction of a user or a session and another bit part for distinction on a display screen in the identification information as described above, there is an advantage that extension and processing are easy and the number of locations requiring modification is comparatively small.

Incidentally, the object applications described above suffer from the following disadvantages because they are not ready or not sufficiently ready for the simplified switching function of a user:

(a) That processing of an application started up by a user who was active in the past but is not active (not in a logon state) at present, that is, processing of an application, which is operating on the background, increases the burden on the CPU.

(b) That an action of an application started up by the user A who was active in the past but is not active (not in a logon state) at present, that is, an action of an application, which is operating on the background, may possibly have a bad influence on an action by the user B who is active at present.

For example, an action which is not intended by the user B who is active at present may be caused by an object application started up by the user A, or an operation, setting or the like by the user B has a bad influence on an action of an application started up by the user A. As a result, after switching to the user A, the user A may be puzzled with a change in action, which is not intended by the user A. Further, when an unnecessary process such as plotting is performed although an application is operating on the background, the process burdens on the CPU.

Therefore, according to the present invention, processing of an application started up by a user who was active in the past but is not active at present from among object applications that have been loaded into the memory of the information processing apparatus and are started up for individual users is temporarily stopped partially.

In particular, if the desktop is switched to a desktop of another user by the simplified switching of a user, then an action of an application that is not necessary as a function is temporarily stopped. For example, the following functions may be regarded as the function to be stopped in this manner:

(a) To temporarily release a memory that is not used.
(b) To stop plotting on the screen.
(c) To turn out the sound.
(d) To stop any other unnecessary process.

It is to be noted that the functions may be rendered operative when necessary. Further, the stopping is "temporary" stopping against which re-starting is anticipated and does not include a sleep state or the like.

If it is detected that a certain user has been rendered active, then processing of the application by the pertaining user is resumed. Consequently, a function necessary for the processing is enabled.

Subsequently, a flow of a message of the operating system upon simplified switching of a user is described.

Figure 4:
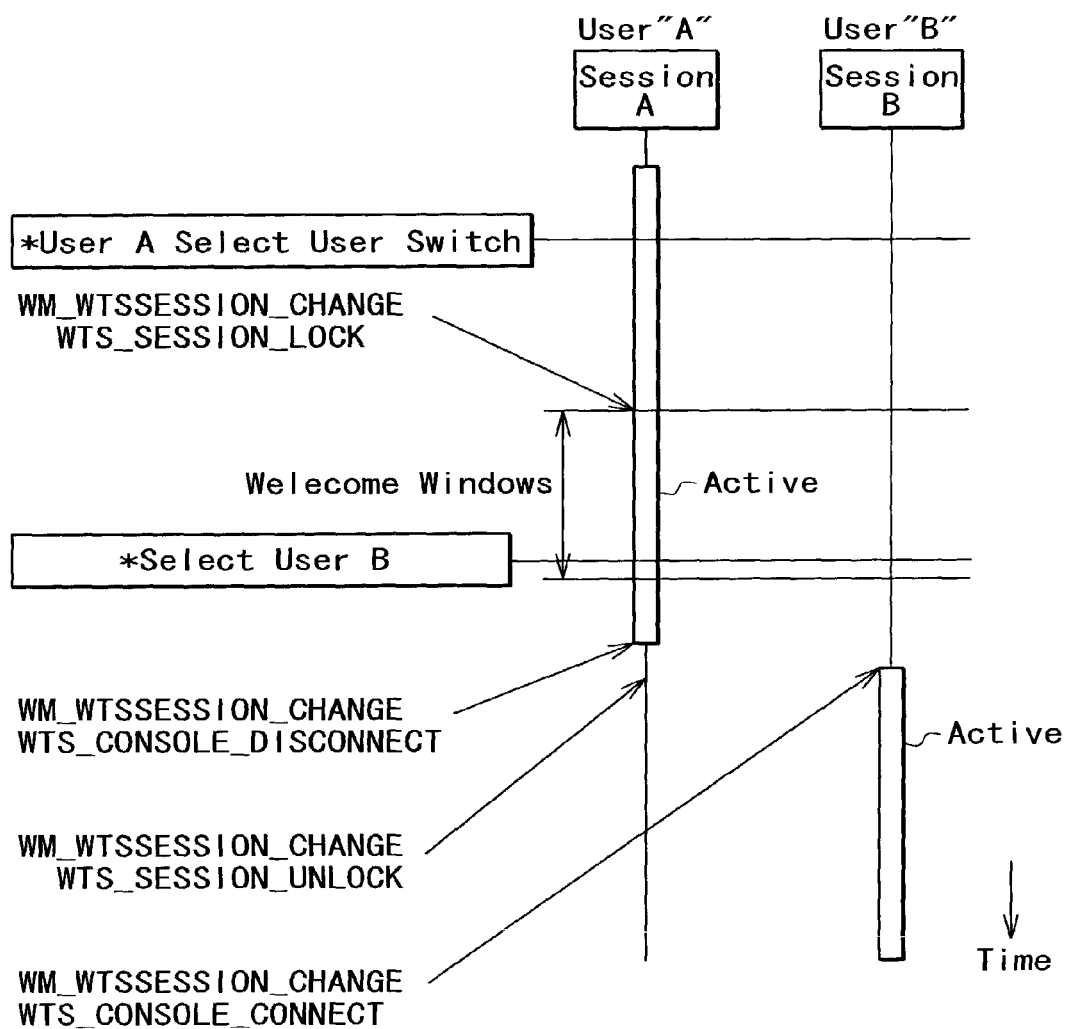
FIG. 4 is a diagrammatic view illustrating switching from a user A to another user B by the information processing apparatus of FIG. 1.
Figure 5:
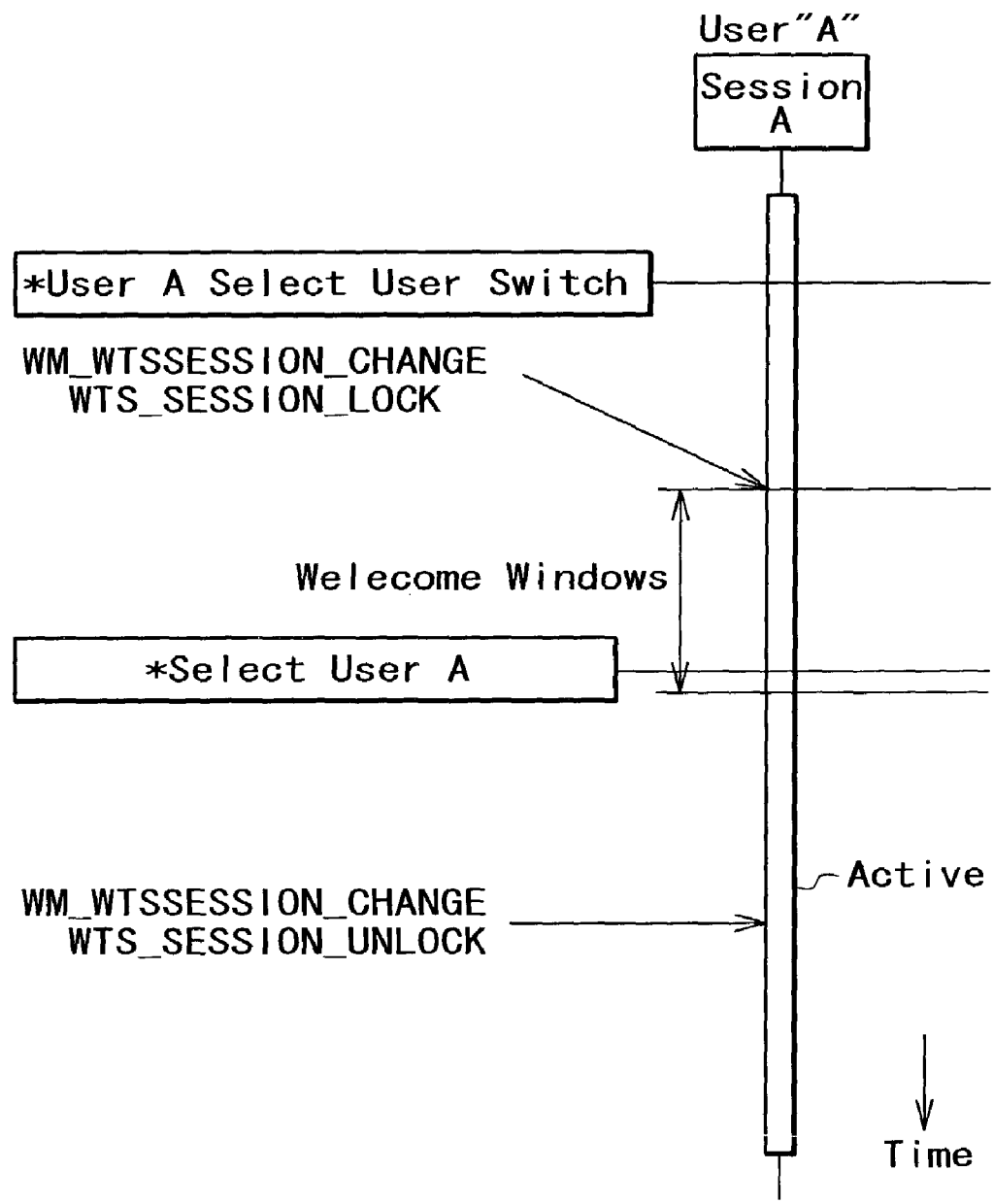
FIG. 5 is a diagrammatic view illustrating switching from the user A to the user A by passing a welcome screen by the information processing apparatus of FIG. 1.

FIG. 4 illustrates a flow of a message of the operating system upon switching from a certain user A (or session A) to another user B (or session B) passing a "Welcome Screen". FIG. 5 illustrates a flow of a message of the operating system upon switching from the certain user A back to the user A passing the "Welcome Screen". It is to be noted that time passes downwardly from above in FIGS. 4 and 5. Further, the "Welcome Windows" is a window for displaying the "Welcome Screen".

Reference characters used in FIGS. 4 and 5 have the following significance:

"WM_WTSSESSION_CHANGE" is a message issued from the OS when a user uses the simplified user switching function or when processing relating to the simplified user switching function is performed by the OS.

When the "WM_WTSSESSION_CHANGE" is issued from the OS, the application side can acquire also a parameter added to the message. The following parameters are involved.

"WTS_SESSION_LOCK" is a parameter added when, while the desktop of a user itself is valid, the desktop is locked and the "Welcome Screen" is displayed instead. After a message to which this parameter is added is issued, the desktop is disabled.

"WTS_SESSION_UNLOCK" is a parameter added upon switching from the "Welcome Screen" to another state. The present parameter is added, for example, when another user switches to the "Welcome Screen" to render the desktop thereof valid or when the user itself switches from the "Welcome Screen" back to the desktop of the user itself.

"WTS_CONSOLE_CONNECT" is a parameter added when, while the desktop of a user itself is invalid, another user switches passing the "Welcome Screen" and the desktop of the user is rendered valid so that the user is placed into a state wherein the user can issue an instruction. After a message to which this parameter is added is issued, the desktop of the user is valid.

"WTS_CONSOLE_DISCONNECT" is a parameter added when the desktop of another user is rendered valid (when a session is rendered inactive). After a message to which this parameter is added, the desktop of the user is invalid.

In FIGS. 4 and 5, the state of each of the users A and B is either active or inactive, and a vertically elongated rectangle indicates the active state whereas a single line indicates the inactive state. Further, the user can normally be in a logon state and the application started up by the user continues to operate whichever the state is active or inactive.

In FIG. 4, the user A is active at first, and after a little moment after the user A performs an operation for the simplified user switching ("User A select User Switch"), the "WM_WTSSESSION_CHANGE" is issued. Since the added parameter at this time is "WTS_SESSION_UN-LOCK", the desktop of the user A is locked and the "Welcome Screen" is displayed instead.

Thereafter, in response to an operation on the "Welcome Screen", switching to the user B is performed ("Select User B"), and after a little moment, the "WM_WTSSESSION_CHANGE" is issued. The added parameter at this time is "WTS_CONSOLE_DISCONNECT", and the desktop of the user A is rendered invalid. Up to this point of time, the user A has been active. It is to be noted that the user B is not active as yet.

The representation "user is active" in the foregoing description is a state wherein the desktop of a user in a logon state is displayed on the screen. However, notice should be taken of the fact that the range (period) of the active state includes such a state wherein the "Welcome Screen" window (Welcome Windows) is displayed as seen in FIG. 4 and the period from the point of time at which the display of the "Welcome Screen" window is erased to the point of time at which the "WM_WTSSESSION_CHANGE" (added parameter is "WTS_CONSOLE_DISCONNECT") is issued. In particular, the representation "user is active" in the present OS not only signifies the state described above but also signifies that a user who has performed the simplified user switching still remains active while the "Welcome Screen" is displayed but is rendered inactive only after switching to another user is performed. Otherwise, the terminology "user is active" may be considered a desktop in a broad sense with regard to a certain user including the "Welcome Screen" upon switching of the user. It is to be noted that, on the "Welcome Screen", an object application is active, that is, operates validly, and a user can use a keyboard or a mouse to select a user, input a password or perform shutdown, standby, re-starting or the like. However, it cannot issue any other instruction. Naturally, if the dial type operation apparatus, hotkey or the like described above is used, some other instruction can be executed also on the welcome screen.

The "WM_WTSSESSION_CHANGE" is issued again at a certain timing later than the point of time of the issuance of the "WM_WTSSESSION_CHANGE" (added parameter is "WTS_CONSOLE_DISCONNECT"). In particular, at this time, the added parameter to the message with regard to the user A (session A) is "WTS_SESSION_UNLOCK", and the added parameter to the message with regard to the user B (session B) is "WTS_CONSOLE_CONNECT". Thus, the desktop of the user B is rendered valid, and hereafter, the user B is active.

In FIG. 5, the user A remains active continuously from the beginning, and after the user A performs the simplified user switching operation ("User A Select User Switch"), the "WM_WTSSESSION_CHANGE" is issued after a little interval of time. Since the added parameter then is "WTS_SESSION_LOCK", the desktop of the user A is locked and the "Welcome Screen" is displayed instead.

Thereafter, the user A is selected ("Select User A") by an operation on the "Welcome Screen", and the "WM_WTSSESSION_CHANGE" is issued after a little interval of time. The added parameter then is "WTS_SESSION_UNLOCK", and the user A returns to the desktop of the user A itself.

Also at and after this point of time, the user A is active.

Also another process is possible wherein, after a resuming state after standby by the user A is passed, operation is re-started and selection of the user B (or the user A) is performed using the simplified user switching function passing the "Welcome Screen". However, a basic flow of the process is similar to that of FIG. 4 and/or FIG. 5. Therefore, overlapping description thereof is omitted herein to avoid redundancy.

FIGS. 6 to 12 illustrate examples of processing where the contents of the present invention are incorporated in an application and indicate minimum necessary processing steps for carrying out the present invention.

Several terms used in FIGS. 6 to 12 have the following significance.

"User definition message" is the "user" here does not signify a user (end user) of an application, but signifies a developer who provides a function of an object application. Consequently, the "user definition message" signifies a message (for an application) that a developer is permitted to define freely on the OS. For example, the user definition message may be a message that the dial of the dial type operation apparatus described hereinabove is operated in the clockwise direction or in the counterclockwise direction or another message that a hotkey, a special operation (or use) key or the like is depressed.

Although the examples above indicate "user definition messages" in a narrow sense, they may be included in "user definition messages" in a broad sense including messages prescribed by the OS, for example, a message representing that a plug of an AC adapter has been pulled off the apparatus or another message representing that a battery has been removed from the apparatus. Further, as regards a relationship between the "user definition message" and FIG. 2, the "user definition message" is a message conveyed from the dynamic link library to the pertaining object application.

The dynamic link library acts for a process that is not provided by the OS or a process that is supported by the OS but does not receive a sufficient service from the OS.

"User application flag" is a flag that is set to "1" when a user is active with regard to an application started up by the user but is set to "0" when the user is not active. It is to be noted that, when the value of the "user application flag" is "1", a process in accordance with the user definition message is performed, but when the flag value is "0", the message is ignored as hereinafter described.

Various forms are available with regard to a method of discriminating whether or not a user is active, and for example, the following forms are included:

(I) Form wherein, making use of message communication from the OS, it is discriminated based on whether or not a predetermined condition is satisfied (message driven method).

(II) Form wherein the object application itself checks periodically after each fixed interval of time (timer driven type).

(III) Form wherein the object application itself checks every time.

(IV) Form wherein it is checked only when a user definition message is received.

Figure 6:
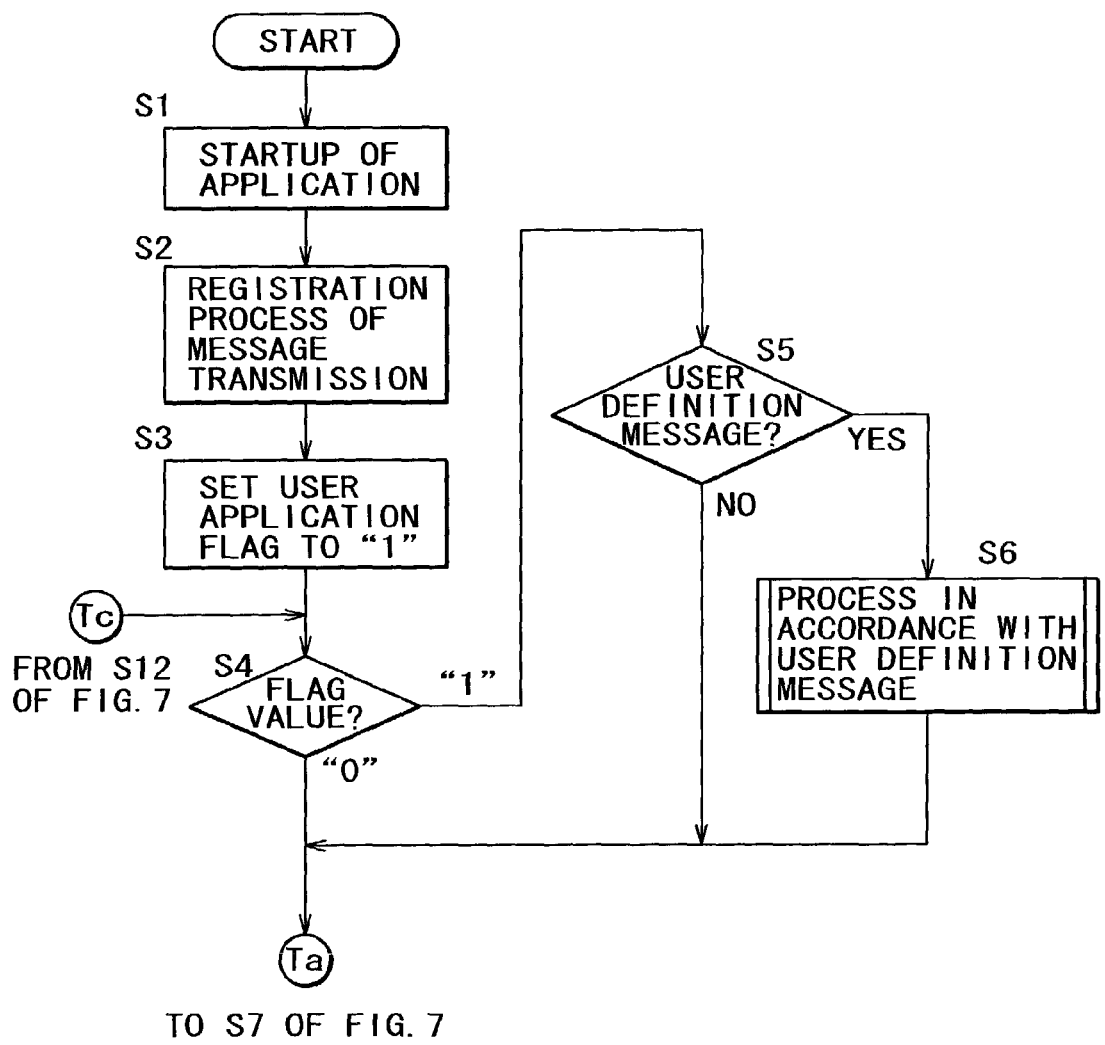
FIGS. 6 and 7 are flow charts illustrating a form of a process of the information processing apparatus of FIG. 1 where a message process is used.
Figure 7:
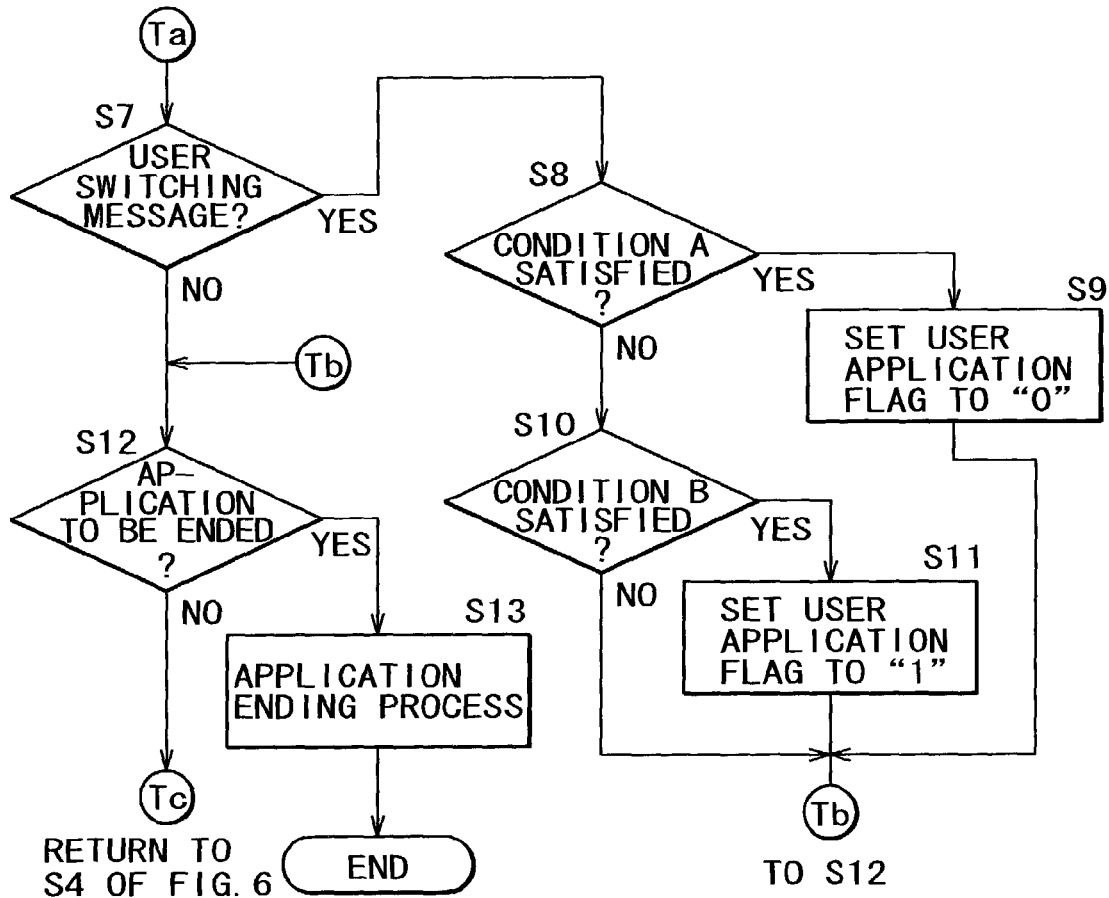

FIGS. 6 and 7 illustrates an example of processing of the form of the (1) message driven method described hereinabove. It is to be noted that the processing illustrated is performed principally with regard to a certain user, for example, the user A. This similarly applies to FIGS. 8 to 12.

In the present example, processing upon simplified switching of a user is performed in accordance with the following algorithm making use of the four cases described above, that is, the four parameters, which may be added to "WM_WTSSESSION_CHANGE".

(1) An object application registers it into the OS that it wants that a message produced upon simplified switching of a user be conveyed to it.

(2) The object application receives a message issued from the OS upon simplified switching of a user.

(3) The object application confirms based on the message of (2) whether or not the user is active.

(4) The object application sets the user application flag in accordance with whether or not the user is active.

A condition (hereinafter referred to as "condition A") when it is desired to temporarily stop the processing of an object application upon or after switching to the welcome screen is that the added parameter when the "WM_WTSSESSION_CHANGE" is issued is "WTS_SESSION_LOCK" (refer to FIGS. 4 and 5).

Condition A: WM_WTSSESSION_CHANGE wParam=WTS_SESSION_LOCK

It is to be noted here that "wParam" signifies an added parameter. If the condition is satisfied, then the value of "wParam" is true, but if the condition is not satisfied, then the value is false.

As described hereinabove, in the case of "WTS_SESSION_LOCK", when the condition A described above is true after the desktop is locked and the welcome screen is displayed instead, if the user application flag is set to "0", then the processing of the object application can be stopped temporarily. In other words, the user definition message is ignored. It is to be noted that, when it is desired to cause the object application to operate on the welcome screen, naturally there is no necessity to observe the setting of the present condition.

A condition (hereinafter referred to as "condition B") when processing of an object application is to be started or to be re-started after its temporary stop, it is started up for the first time or it is rendered operative from the welcome screen. In the latter case, either switching from the user A to the user B passing the "Welcome Screen" is performed (the added parameter to the "WM_WTSSESSION_CHANGE" is "WTS_CONSOLE_CONNECT") as seen from FIG. 4 or switching from the user A back to the user A passing the "Welcome Screen" is performed as seen in FIG. 5.

The condition B is described more particularly.
Condition B:

(startup for the first time) OR (WM_WTSSESSION_CHANGE wParam=WTS_CONSOLE_CONNECT) OR [(WM_WTSSESSION_CHANGE wParam=WTS_SESSION_UNLOCK) AND (acquisition of "WTSActive" through call of "function (WTSQuerySessionInformation())"]

"OR" is a synonym of the logical operator "||" and signifies "or", and "AND" is a synonym of the logical operator "&&" and signifies "and". Further, the function "WTSQuerySessionInformation()" is a function provided by the Win32API (Application Program Interface). If the value obtained when the function is called is "WTSActive", then this indicates that the user is active.

The second term of the condition B corresponds to the case of FIG. 4, and the third term corresponds to the case of FIG. 5. It is to be noted that, as regards the latter, WM_WTSSESSION_CHANGE wParam=WTS_SESSION_UNLOCK by itself is insufficient. It is necessary to confirm that the user A is active after switching back from the welcome screen.

"wParam" signifies an added parameter. If the condition B is satisfied, then "wParam" is true, and at this time, the user application flag is set to "1". On the other hand, if the condition B is not satisfied, then "wParam" is false.

In short, the condition B arises from the fact that, upon startup for the first time, it is necessary to render the application operative and the fact that it is necessary to return the user application flag, which was set to "0" upon the last switching to the welcome screen, to "1" to enable the application for the active user. Accordingly, for example, when switching from the user A to the user B is performed in FIG. 4, while the user A remains inactive, an instruction to the application from the user A is not accepted. Therefore, the user cannot issue an instruction (or such an instruction is ignored).

The processing illustrated in FIGS. 6 and 7 is described taking the foregoing into consideration. Referring first to FIG. 6, after the user A starts up an object application at step S1, a registration process is performed at step S2 so that, when simplified switching of a user is performed, the pertaining message (WM_WTSSESSION_CHANGE) may be sent from the OS to the application later.

Then at step S3, the user application flag is set to "1". This is because of the reason that, upon startup of an application for the first time, the application must be rendered active as described hereinabove.

Then at step S4, a condition discrimination of the state of the user application flag is performed. If the flag value is "1", then the processing advances to step S5. However, if the flag value is "0", then the processing advances to step S7 of FIG. 7.

At step S5, it is discriminated whether or not a user definition message has been received. The message was defined on the OS by the developer as described above and is not a message supported as a standard by the OS and produced when a device such as a mouse or keyboard is operated but a message conveyed to the application, for example, when the dial type operation apparatus, hotkey, special operation key or the like is operated. If the message is received, then the processing advances to step S6, but in any other case, the processing advances to step S7.

At step S6, a process corresponding to the received user definition message, for example, plotting of a screen or reproduction of music is performed. Thereafter, the processing advances to step S7.

Referring now to FIG. 7, simplified user switching is discriminated at step S7. In particular, it is discriminated whether or not a message indicating that user switching is to be performed is received from the OS. More particularly, if the message "WM_WTSSESSION_CHANGE" is issued and therefore a notification of this is received, then the processing advances to step S8, but if no such notification is received, then the processing advances to step S12.

At step S8, it is discriminated whether or not the received message indicates switching to the "Welcome Screen". In other words, it is discriminated whether or not the condition A described hereinabove is satisfied. If the condition A is satisfied, then the processing advances to step S9, but if the condition A is not satisfied, then the processing advances to step S10.

At step S9, the user application flag is set to "0". Consequently, the processing of the application is temporarily stopped partially and an operation of the user is rendered invalid. Consequently, in this state, the processing does not advance to step S6. In other words, if the flag value is not set to "0" at step S9, then, for example, when user switching is performed from the user A to the user B, an operation of the user B or the like has an influence on the application of the user A.

At step S10, it is discriminated whether or not the received message indicates that user switching has been performed from the "Welcome Screen" to the user A. In other words, it is discriminated whether or not the condition B is satisfied (except the discrimination upon startup for the first time, because the user application flag was set to "1" at step S3). If the condition B is satisfied, then the processing advances to step S11, but if the condition B is not satisfied, then the processing advances to step S12.

At step S11, the user application flag is set to "1". Consequently, when the user is active, the user can issue an instruction to the application. In other words, the processing thereafter advances from step S4 to steps S5 and S6 so that a process corresponding to the user definition message is performed.

At step S12, it is discriminated whether or not the application should be ended. If the application should be ended, then the processing advances to step S13, at which an ending process for the application is performed. Otherwise, the processing returns to step S4 of FIG. 6.

Figure 8:
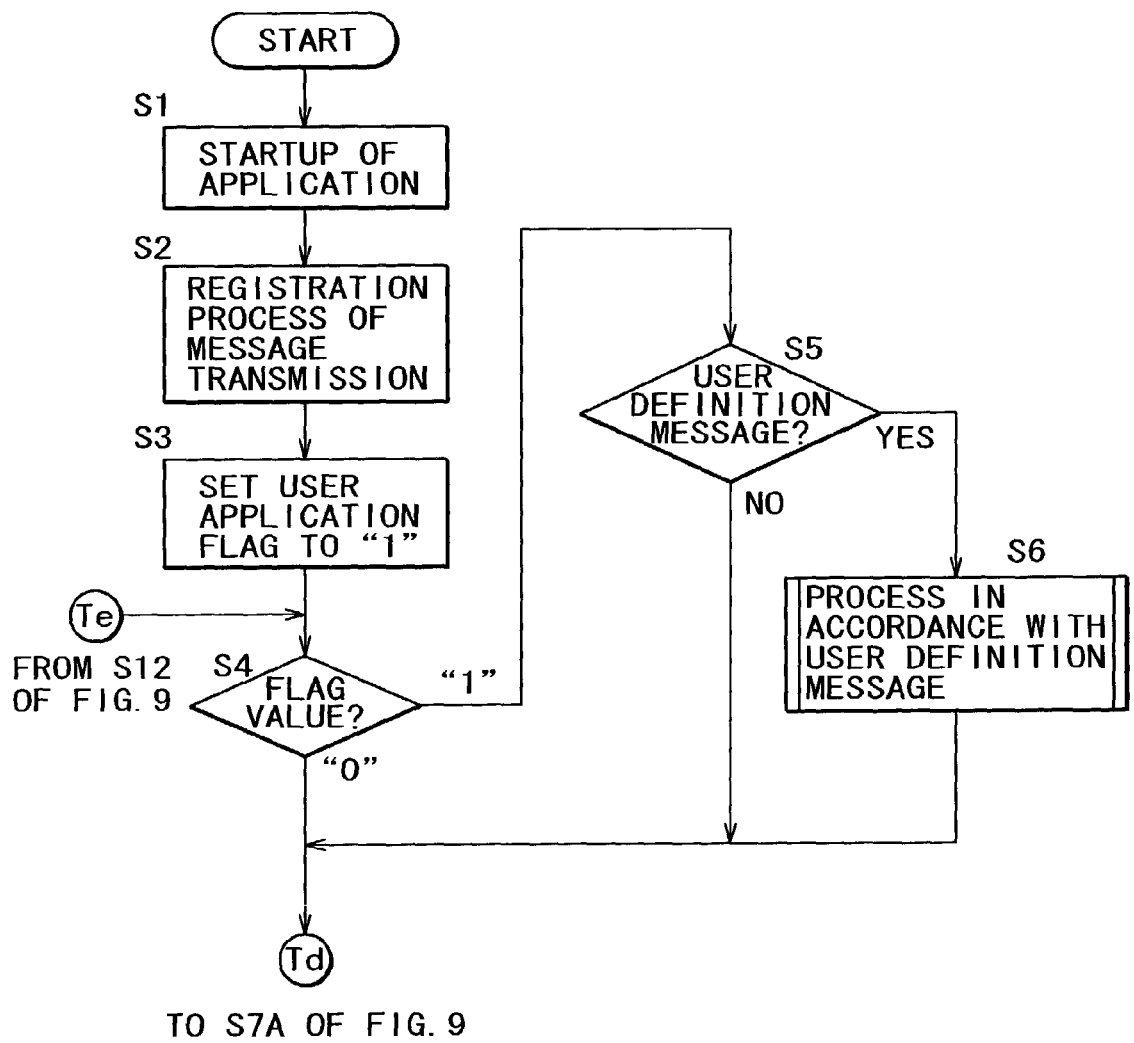
FIGS. 8 and 9 are flow charts illustrating another form of a process of the information processing apparatus of FIG. 1 where a timer driven process is used.
Figure 9:
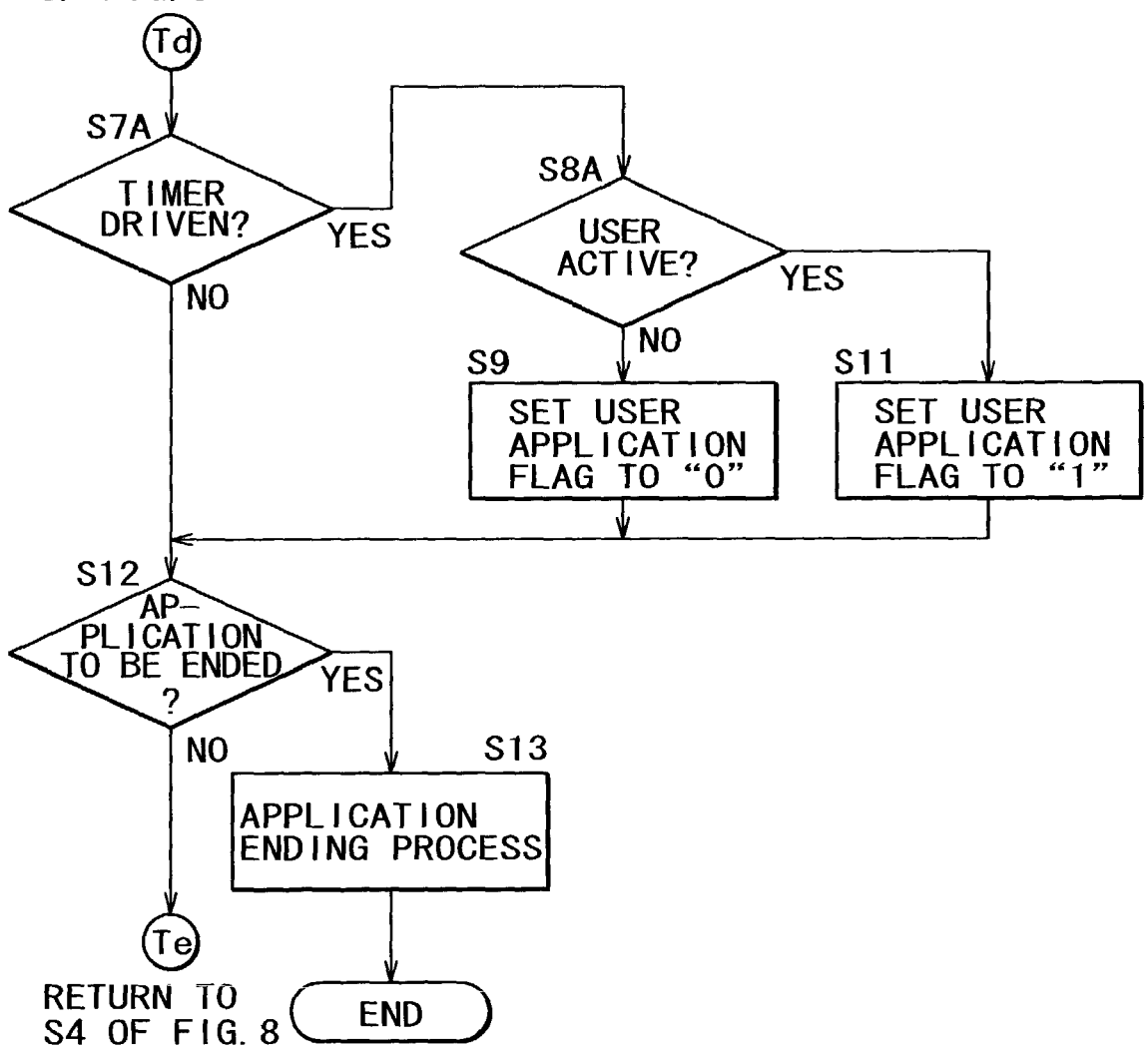

FIGS. 8 and 9 illustrate an example of processing regarding the form of the (II) timer driven type.

In the present example of the processing, the timer is driven at fixed very short intervals of time such as approximately 100 milliseconds (interval timer interrupt) to discriminate whether or not a user is active. Thus, the following description is given principally of differences of the processing from the processing described hereinabove with reference to FIGS. 6 and 7.

The former half of the processing illustrated in FIG. 8 is substantially same as that of FIG. 6. Therefore, description of the steps in FIG. 8 is omitted herein to avoid redundancy. When it is discriminated at step S4 of FIG. 8 that the value of the user application flag is "0", it is not discriminated at step S5 that a user definition message is received, or after the process at step S6 is completed, the processing advances to step S7A of FIG. 9. Referring to FIG. 9, at step S7A, it is discriminated whether or not the timer, which confirms whether or not a user is active, has been driven. If the timer has been driven, then the processing advances to step S8A, but otherwise, the processing advances to step S12.

At step S8A, it is discriminated whether or not the user is active. In particular, if "WTSActive" is acquired when the function "WTSQuerySessionInformation()" provided by the Win32API is called, then it is discriminated that the user is active. In this instance, the processing advances to step S11, at which the user application flag is set to "1". However, if the user is not active at step S8A, then the processing advances to step S9, at which the user application flag is set to "0".

Then, the processing advances from step S9 or S11 to step S12.

In the present example, the timer driven system is used to discriminate whether or not a user is active, and every time a fixed interval of time elapses, the object application calls the function. Therefore, since the user A is active on the "Welcome Screen" as described hereinabove with reference to FIG. 4, the user application flag is set to "1". As a result, the application operates also on the "Welcome Screen".

Figure 10:
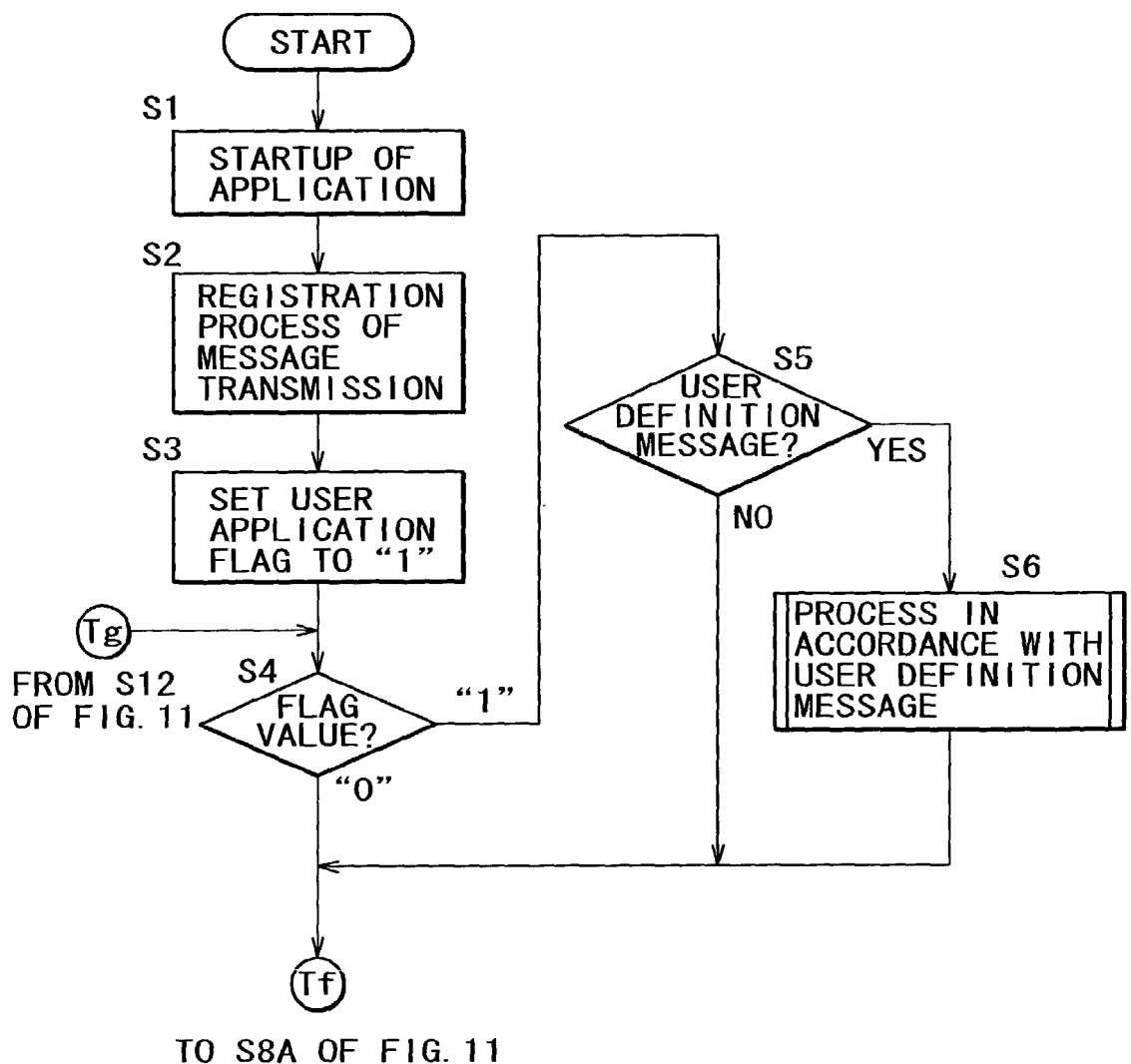
FIGS. 10 and 11 are flow charts illustrating a further form of a process of the information processing apparatus of FIG. 1 where a process of checking and confirming whether or not a user is active is executed every time.
Figure 11:
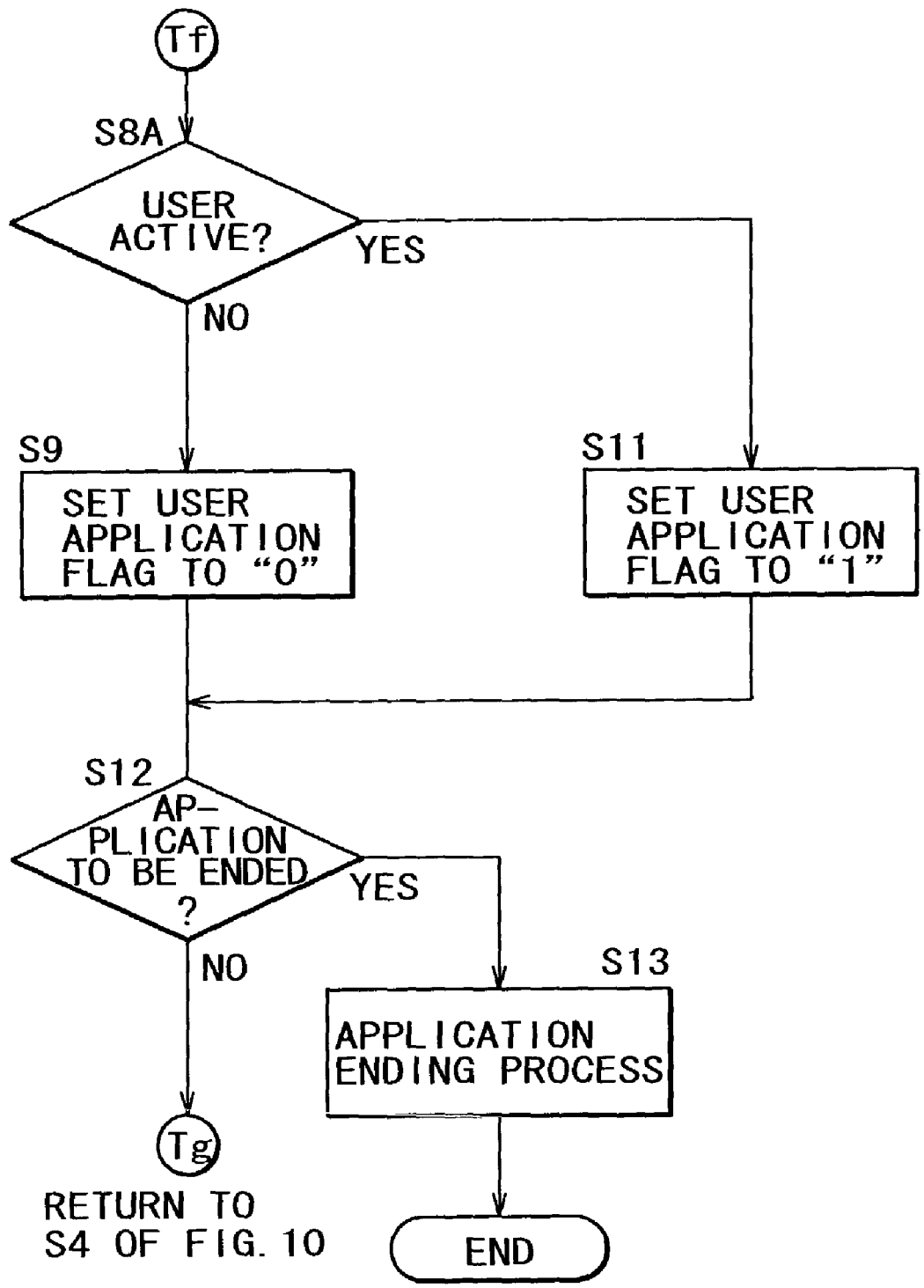

FIGS. 10 and 11 illustrate essential part of an example of processing regarding the form (III) described hereinabove.

In the processing of FIGS. 10 and 11, a state of the user application flag is checked first, and then confirmation, which is for whether or not a user is active, is performed every time. The following description is given principally of differences of the processing from the processing described hereinabove with reference to FIGS. 8 and 9.

The former half of the processing illustrated in FIG. 10 is substantially same as that of FIG. 8. Therefore, description of the steps in FIG. 10 is omitted herein to avoid redundancy. When it is discriminated at step S4 of FIG. 10 that the value of the user application flag is "0", it is discriminated at step S5 that a user definition message is not received, or after the process at step S6 is completed, the processing advances to step S8A of FIG. 11. Referring to FIG. 11, at step S8A, it is discriminated whether or not the user is active. In particular, if "WTSActive" is acquired when the function "WTSQuerySessionInformation()" provided by the Win32API is called, then it is discriminated that the user is active. In this instance, the processing advances to step S11, at which the user application flag is set to "1". However, if the user is not active at step S8A, then the processing advances to step S9, at which the user application flag is set to "0".

Then, the processing advances from step S9 or S11 to step S12.

Also in the present processing, the object application calls the function and the application acts also on the "Welcome Screen" similarly as in the processing described hereinabove with reference to FIGS. 8 and 9.

FIG. 12 illustrates an example of processing regarding the form (IV) described hereinabove.

In the processing of FIG. 12, only when a user definition message is received, confirmation, which is for whether or not the user is active, is performed through a call of the function. The following description is given principally of differences of the processing from the processing described hereinabove with reference to FIGS. 6 and 11.

Referring to FIG. 12, processes at steps S1 and S2 are similar to those described hereinabove with reference to FIG. 6, 8 or 10, and therefore, description of them is omitted herein to avoid redundancy. At step S5 next to step S2, it is discriminated whether or not a user definition message is received. If a user definition message is received, then the processing advances to step S8A, but otherwise, the processing advances to step S12.

At step S8A, it is discriminated whether or not the user is active. In particular, if "WTSActive" is acquired when the function "WTSQuerySessionInformation()" provided by the Win32API is called, then it is discriminated that the user is active. In this instance, the processing advances to step S6, at which a process corresponding to the received user definition message such as, for example, plotting of a screen or reproduction of music is performed, whereafter the processing advances to step S12 so that the discrimination process regarding ending of the application may be performed. However, if the user is not active at step S8A, then the processing advances directly to step S12.

Also in the present processing, the object application calls the function. However, the user application flag is not used, and necessary processing is performed only when it is confirmed at step S8A next to step S5 that the user is active. Further, the application operates also on the "Welcome Screen" similarly as in the processing in FIGS. 8 and 9 or the like.

Although the "user definition message" is such a message in a narrow sense or a message in a broad sense as described above. However, in the latter case, when a "message prescribed by the OS" is received, the object application tries to perform a function process corresponding to the message. Therefore, at that time, whether or not the user is active should be discriminated to make a determination with regard to execution of the process.

Since the form (I) uses a message issued when a process relating to the simplified switching function of a user by the OS or in a like case is performed and an added parameter to the message as described above, discrimination regarding the conditions A and B described hereinabove is required. However, since it is only necessary to perform a discrimination of whether or not the user is active upon switching of a user, there is an advantage that the overhead is comparatively small.

Meanwhile, in the form (II) or (III), discrimination and confirmation of whether or not the user is active are performed normally or at fixed intervals of time by an application, and it can be discriminated readily from a result when a necessary function is called. Further, in the form (IV), when a user definition message is issued, it is discriminated by the application whether or not the user is active. Therefore, it can be determined directly without the necessity for the user application flag or the like whether or not a process corresponding to a user definition message (or a message issued by the OS) should be performed.

It is to be noted that, although the steps S2 in FIGS. 8, 10 and 12 remain as they are for the convenience of description, the steps are not required specifically.

From the configuration described above, for example, the following advantages can be anticipated.

By temporarily stopping processing of an object application of a user who is not active at present (a user in a logon state who was active in the past), another user who is active can execute processing of its object application without being influenced by the first-mentioned user.

By temporarily stopping processing of an object application of a user who is not active at present (a user in a logon state who was active in the past), possible occurrence of an action that the user does not intend or anticipate can be prevented.

By temporarily stopping processing of an object application of a user who is not active at present (a user in a logon state who was active in the past), the load of the entire apparatus upon the CPU can be reduced and the used amount of the memory can be reduced.

In addition to the direct advantages described above, for example, the following indirect advantages can be anticipated.

If some thread or the like of an ordinary object application or an object application of a user who is not active at present is permitted to remain operative without being stopped, then when the user is rendered active later, the user can acquire a result of the execution of the thread or the like. This feature is convenient because processing is not interrupted, for example, in automatic reception of an electronic mail, automatic cycling of webs and so forth.

If data set by a user who has used an object application are stored when simplified user switching is detected, then necessary data can be protected.

On the welcome screen, operation and inputting by a keyboard and a mouse are normally disabled, and only functions provided on the screen by the OS can be used. However, if an object application is left operative to function on the welcome screen as described hereinabove in connection with FIGS. 8 to 12, various processes other than those setting as standard processes such as, for example, adjustment of the sound volume, change of the brightness of the screen and reproduction of music data can be performed. If the form described hereinabove with reference to FIGS. 6 and 7 is used, a user who is active can execute various application processes by receiving a message issued by the OS.

It is convenient to make it possible to execute, for example, a process determined in advance or a process designated in advance when it is detected that a user is rendered active (automatic startup process upon switching of a user). For example, notification of reception of an electronic mail, display of a schedule and so forth can be performed.

It is to be noted that the present invention can be not only applied to an information processing apparatus having a simplified switching function of a user described above and a program used for the information processing apparatus but also applied widely to information recording media in or on which an object application for implementing the functions described above (a recording medium that can be loaded into an apparatus so that a program can be loaded into a memory of the apparatus) is recorded and processing methods for an application utilizing the simplified switching function of a user wherein it is detected whether or not a user is active and a necessary process is executed or an unnecessary process is temporarily stopped in accordance with a result of the detection.

While a preferred embodiment of the present invention has been described using specific terms, such description is for illustrative purposes only, and it is to be understood that changes and variations may be made without departing from the spirit or scope of the following claims.

What is claimed is:

1. A computer system which supports multiple users by providing for independent and distinct user environments for each user, said system comprising:

user switching means providing a change in presentation of a display from a first user's independent and distinct user environment to a second user's independent and distinct user environment without completely terminating an application instance started by the first user, thereby providing for the ability to support a plurality of users logged into the system simultaneously and for each of the plurality of users to run a separate instance of the same or different application, but wherein only one user at a time can be the currently active user;

means for temporarily stopping at least part of the execution of the application instance started by the first user who was active in the past but who is not the active user at present and retaining a portion of the application instance in memory such that an instance of the same or different application started by the second user is not affected by the continued existence or execution of the application instance started by the first user; and means for re-starting the execution of at least the part of said application instance started by the first user that was temporarily stopped when it is detected later that the first user is rendered the active user again.

2. The computer system according to claim 1, wherein a device or hardware function implemented by said application instance started by the first user is not supported as a standard device or hardware function or not managed by the operating system incorporated in said information processing apparatus or is supported as a standard device or hardware function by the operating system but is not sufficiently ready for the user switching means.

3. The computer system according to claim 1, wherein said system has a dynamic link library and a device driver for managing a device or hardware loaded therein by said application instance started by the first user and further comprises a message processing means for processing a message and identification information to be recorded into said device driver in order to acquire a message by said dynamic link library including a part for distinguishing between users or sessions and another part for distinguishing windows on a display screen such that identification information for different users and different windows does not have the same contents so that a single destination of transmission of a message is specified to allow said message processing means to process the message.

4. The computer system according to claim 1, wherein a message and a parameter, added to the message issued when operation related to the user switching means is performed, are used for the application instances to determine which of the first user and the second user is active.

5. The computer system according to claim 1, wherein said application instances call functions normally or at fixed intervals of time to discriminate which user is active.

6. The computer system according to claim 1, wherein said system determines which user is active when a message with regard to the function of the device or hardware is issued.

7. The computer system according to claim 1, wherein said means for temporarily stopping at least part of the execution of the application instance started by the first user stops only a portion of the execution of the application instance started by the first user.

8. The computer system according to claim 1, wherein the application instance started by the first user, upon user switching from the first user to a second user, is not caused to load or operate on user data of the second user.

9. The computer system according to claim 1, wherein, after user switching from the first user to the second user, the second user is not allowed access to the application instance started by the first user.

10. The computer system according to claim 1, wherein, after user switching from the first user to the second user, the application instance started by the first user is at least partially prevented from consuming system resources available to the second user.

11. The computer system according to claim 1, wherein the application instance started by the second user is of the same application as the application instance started by the first user.

12. A method for providing an independent and distinct user environment for each one of a plurality of computer users, said method comprising:

providing for a change in presentation of a display from a first user's independent and distinct user environment to a second user's independent and distinct user environment without completely terminating an application instance started by the first user, thereby providing the ability to support a plurality of users logged into the system simultaneously and for each of the plurality of users to run a separate instance of the same or different application, but wherein only one user at a time can be the currently active user;

stopping at least part of the processing of the application instance started by the first user who was active in the past but who is not currently active and retaining a portion of the application instance in memory such that an instance of the same or different application started by the second user is not affected by the continued existence or execution of the application instance started by the first user; and re-starting processing of at least part of said application instance started by the first user that was temporarily stopped when it is detected later that the first user is rendered active.

13. The method according to claim 12, wherein a message and a parameter, added to a message issued when user switching is performed, are used to determine which of the first and the second user is active.

14. The method according to claim 12, wherein said application instances call functions normally or at fixed intervals of time to discriminate which user is active.

15. The method according to claim 12, wherein temporarily stopping at least part of the execution of the application instance started by the first user stops only a portion of the execution of the application instance started by the first user.

16. The method according to claim 12, wherein the application instance started by the first user, upon user switching from the first user to a second user, does not load or operate on user data of the second user.

17. The method according to claim 12, wherein, after user switching from the first user to the second user, the second user is not allowed access to the application instance started by the first user.

18. The method according to claim 12, wherein, after user switching from the first user to the second user, the application instance started by the first user is at least partially prevented from consuming system resources available to the second user.

19. The method according to claim 12, wherein the application instance started by the second user is the same application as the application instance started by the first user.

20. An information processing system comprising a cpu and memory which supports multiple users by providing for independent and distinct user environments for each user, said system comprising:

means for switching an active user of the system from a first user's independent and distinct user environment to a second user's independent and distinct user environment without completely terminating a first application instance started by the first user, thereby providing for the ability to support a plurality of users logged into the system simultaneously and for each of the plurality of users to run a separate instance of the same or different application, but wherein only one user at a time can be the currently active user;

means for temporarily stopping at least part of the execution of the application instance started by the first user who was active in the past but who is not the active user at present and retaining a portion of the application instance in memory such that an instance of the same or different application started by the second user is not affected by the continued existence or execution of the application instance started by the first user; and means for switching an active user of the system from the second user's independent and distinct user environment to the first user's independent and distinct user environment without completely terminating a second application instance started by the second user, means for temporarily stopping at least part of the execution of said second application instance started up by the second user who was active in the past but who is not the active user at the present and retaining a portion of the application instance started by the second user in memory; and means for re-starting the execution of at least the part of said application instance started by the first user that was temporarily stopped when it is detected that the first user is rendered the active user again.

* * * * *